Dec. 29, 1942.   J. C. McCUNE ET AL   2,306,485
INERTIA OPERATED CONTROL DEVICE
Original Filed Sept. 27, 1941   2 Sheets-Sheet 1

INVENTORS
Joseph C. McCune
George K. Newell
BY
ATTORNEY

Dec. 29, 1942. J. C. McCUNE ET AL 2,306,485
INERTIA OPERATED CONTROL DEVICE
Original Filed Sept. 27, 1941 2 Sheets-Sheet 2
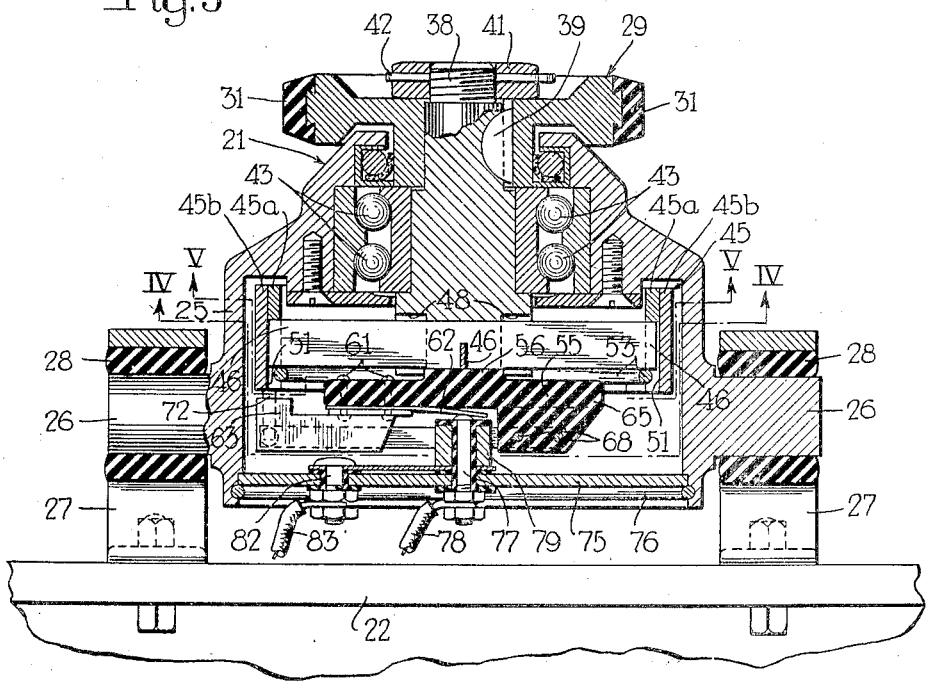
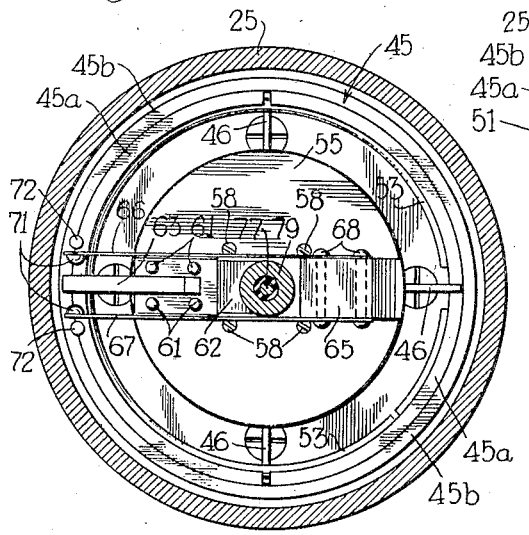
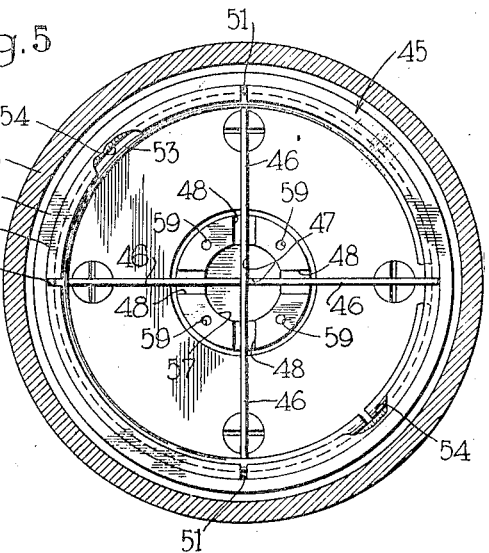
INVENTORS
Joseph C. McCune
George K. Newell
BY
ATTORNEY Patented Dec. 29, 1942

2,306,485

UNITED STATES PATENT OFFICE 2,306,485

INERTIA OPERATED CONTROL DEVICE

Joseph C. McCune, Edgewood, and George K. Newell, near Pitcairn, Pa., assignors to The Westinghouse Air Brake Company, Wilmerding, Pa., a corporation of Pennsylvania Original application September 27, 1941, Serial No. 412,658. Divided and this application March 7, 1942, Serial No. 433,758

4 Claims. (Cl. 200—52)

This invention relates to inertia operated control devices for registering the rate of change of speed of a rotary element, such as a vehicle wheel, for a desired purpose such as the control of the brakes associated with vehicle wheel to prevent sliding thereof, the present application being a division of our prior application Serial No. 412,658, filed September 27, 1941.

Various types of rotary inertia devices have been proposed and employed comprising essentially an inertia ring mounted in concentric or coaxial relation to a driving shaft or spindle and arranged to be driven by rotation of the shaft through a resilient yielding connection that holds the inertia ring in a certain normal position with respect to the shaft as long as the shaft rotates at a constant speed and which permits limited rotational shifting of the inertia ring relative to the shaft in either a forward or a lagging direction substantially in proportion to the rate of deceleration and acceleration of the shaft respectively.

In one type of rotary inertia device, such as that shown in Patent 2,198,033 to Clyde C. Farmer, the inertia ring is journaled on a supporting spindle attached to the end of the axle of a railway car wheel unit, springs being provided merely for the purpose of holding the inertia ring in a certain normal position while the axle rotates at a constant speed and yieldingly permitting limited rotative movement of the inertia ring relative to the spindle in either direction.

In another type of rotary inertia device, such as that shown in Patent 2,290,589 of Adelbert A. Steinmiller, the inertia ring is wholly supported in concentric relation to its driving spindle by a plurality of radially arranged leaf springs which have a sliding connection with the inertia ring to permit limited rotative shifting of the inertia ring relative to the spindle in either direction from a normal position, thereby obviating the need for journaling the inertia ring in direct supporting relation on its driving spindle and avoiding bearing difficulties resulting from shock and vibration.

It is an object of our present invention to provide a rotary inertia device, of the type illustrated in Patent 2,290,589 and characterized by improved structural details for simplifying and reducing the cost of manufacture.

It is a further object of our invention to provide a rotary inertia device of the type indicated in the foregoing object and further characterized by a novel switch mechanism arranged to be operated in response to deceleration or acceleration of a rotary element.

The above objects, and other objects of our invention which will be made apparent hereinafter, are attained in several embodiments of our invention subsequently to be described and shown in the accompanying drawings, wherein Fig. 1 is a fragmental plan view of a wheel truck having the car wheels journaled on a non-rotative axle and showing the manner in which our rotary inertia device is associated in driving relation to the car wheels.

Fig. 3 is an enlarged vertical sectional view, taken substantially on the line III—III of Fig. 1, showing details of construction of our rotary inertia device and the manner of mounting thereof, Fig. 4 is a sectional view, taken on the line IV—IV of Fig. 3, and Fig. 5 is a sectional view, taken on the line V—V of Fig. 3.

Figure 1:
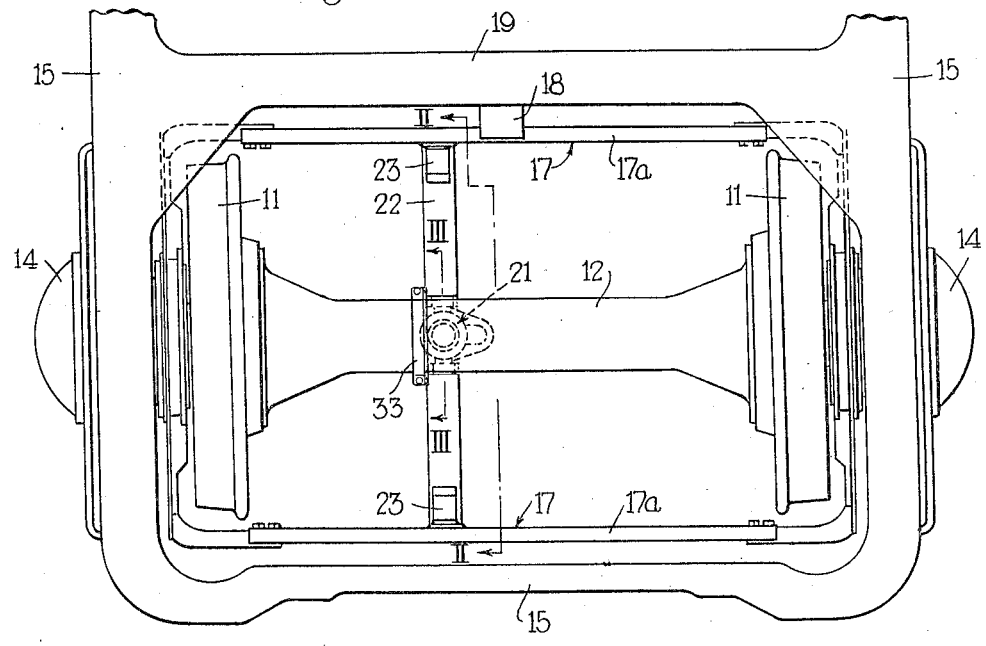

The rotary inertia device comprising our present invention may be readily associated with any rotary element or shaft but for purposes of illustration it has been shown in the drawings as associated with the axle of a railway car truck and will be so described herein. It should be understood, therefore, that our rotary inertia device is not limited in its application to the particular use illustrated and described.

Figure 2:
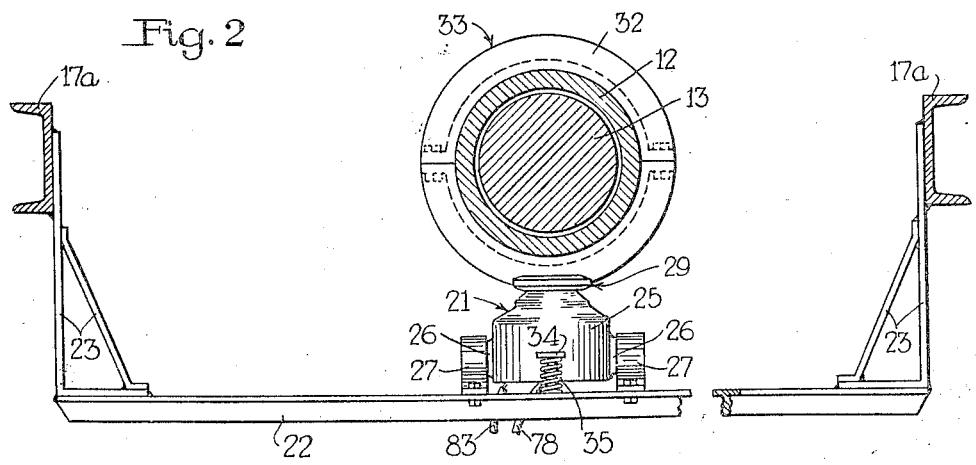
Fig. 2 is a view, taken substantially on the line II—II of Fig. 1, showing in further detail the manner of mounting our rotary inertia device in associated relation to the car wheels.

Referring to Figs. 1 and 2 of the drawings, one end of a railway car truck is shown wherein a wheel and axle assembly, comprising a pair of wheels 11 fixed on opposite ends of a tubular axle 12, is rotatably mounted or journaled by roller bearings (not shown) on a non-rotative axle 13. The outer ends of the non-rotative axle 13 are in turn supported in suitable end casings or journals 14 that are externally grooved in a manner to permit vertical sliding movement of the truck frame 15 relative thereto. Suitable coil springs (not shown) support the truck frame 15 on the four journals 14 of a truck, only two journals being shown.

Suitable brake mechanism (not shown) is associated with the car wheels 11 and the tubular axle 12. This brake mechanism is preferably of the rotary disk type shown in the copending application of Joseph C. McCune, one of the present joint applicants, Serial No. 407,554, filed August 20, 1941.

In the type of rotary disk brake mechanism shown in the above-mentioned application Serial No. 407,554, a series of annular brake rings are carried by the tubular axle 12 in concentric relation thereto and disposed in alternate relation with non-rotative annular brake rings carried on a rectangular frame 17 that is pivotally mounted on the axle casings 14 in a manner to rock about an axis coincident with the axis of rotation of the car wheels. The frame 17 engages in a yoke braket 18 attached to a transverse portion 19 of the truck frame and is thereby, prevented from pivotal movement with respect to the frame except to a limited degree resulting from raising and lowering of the truck frame due to variations in load carried thereby.

The details of the brake mechanism do not form any part of our present invention and they have therefore been omitted from the drawings, particularly because reference may be had to the copending application Serial No. 407,554 for such details.

According to our invention, a rotary inertia device 21 is supported beneath the tubular axle 12 on a horizontally extending structural beam 22 that is attached by brackets 23 to the side members 17a of the rectangular frame 17.

The rotary inertia device 21 comprises a substantially cylindrical or tubular casing 25 having trunnions 26 at diametrically opposite sides thereof, the trunnions being journaled in suitable brackets 27 attached to the beam 22. Bushings 28 of resilient material, such as rubber, are interposed between the trunnions and the brackets 27 to minimize shock to the rotary inertia device due to travel of the car along the rails.

The rotary inertia device is further provided with a driving wheel 29 having a rim or tire 31 of suitable frictional material, such as rubber or fibrous material, that engages a radially extending flange 32 of a split ring 33 secured to the outer periphery of the tubular axle 12.

The casing 25 of the rotary inertia device is also provided with a projecting lug 34; and a suitable coil spring 35 is interposed between the lug 34 and the supporting beam 22 in a manner to yieldingly urge the driving wheel 29 into engagement with the flange 32. It should thus be apparent that although the rectangular frame 17 may shift rockably about the axis of rotation of the car wheels to a limited extent the radial distance from the axis of rotation of the car wheels to the point of contact of the driving wheel 29 of the rotary inertia device on the flange 32 remains constant. Consequently the driving wheel 29 of the rotary inertia device is rotated at all times in accordance with the rotational speed of the tubular axle 12 and the car wheels 11 fixed thereto.

Referring to Figs. 3, 4 and 5, details of construction of our rotary inertia device will now be described. The driving wheel 29 is secured to the end of a spindle or shaft 38 by a key 39 and a nut 41 screwed on the outer threaded end of the spindle 38, the nut 41 being locked thereon as by a pin 42. The spindle 38 is rotatably supported in the casing 25 by suitable bearings, such as the ball bearings 43 shown.

An inertia ring 45 is supported within the tubular casing 25 in concentric relation to the spindle 38 on the ends of a pair of crossed leaf spring elements 46. The two leaf spring elements 46 are notched or sawed at a point midway between the opposite ends thereof to permit the two spring elements to be fitted together in intersecting and substantially perpendicular relation to each other. The inner end of the spindle 38 is provided with two intersecting slots 47 for receiving the spring elements therein. Recesses 48 are formed at the outer ends of the slots 47 in order to enable that portion at each end of the spring elements 46 between the spindle and the inertia ring to be a desired length. The sides of the recesses 48 are spaced sufficiently from the spring elements as not to interfere with normal bending of the spring elements.

The inertia ring 45 is made up of an inner ring 45a of suitable material, such as brass, and an outer ring 45b of steel shrunk or pressed on the ring 45a. The inner ring 45a is provided with four slots 51, cut or sawed therein at intervals of 90° around the ring, in which slots the outer ends of the leaf spring elements 46 are received in close-fitting slidable relation, the outer end of the leaf spring elements having a slight clearance with the inner bore of the outer ring 45b which is continuous and not slotted.

A snap ring 53 is inserted in an annular groove 54 formed on the inner bore of the inner ring 45a for holding the inertia ring on the outer ends of the spring element 46.

Patent 2,290,589, mentioned above, discloses and claims a rotary inertia device wherein the inertia ring is supported in concentric relation to a rotary spindle by means of a plurality of intersecting leaf springs fixed on the spindle and having the outer ends engaging in slots in the inertia ring. Such feature is accordingly not broadly claimed herein.

The intersecting leaf spring elements 46 are secured in the slots 47 of the spindle 38 by means of a circular or disk member 55 of insulating material, such as "Bakelite" or "Micarta." The insulating disk 55 is provided with a circular projection 56 at the central portion thereof which enters into a corresponding shallow circular recess 57 in the end of the spindle 38 for the purpose of centering the disk 55 with respect to the spindle. The disk 55 is secured to the end of the spindle by means of four screws 58 which extend through the disk and engage in tapped holes 59 in the end of the spindle 38. The projection 56 on the disk 55 engages the one edge of the leaf spring elements 46, thereby holding the spring elements locked in a fixed axial position on the spindle 38.

Secured to the lower face of the disk 55, as by a plurality of rivets 61, are a flexible spring contact 62 of suitable conducting metal and a radially extending contact arm 63.

At a point substantially diametrically opposite to the contact arm 63 there is formed on the disk 55 a projecting lug 65, to the opposite sides of which two flexible contact fingers 66 and 67 of suitable conducting metal are secured as by rivets 68, in substantially parallel relation.

The contact fingers 66 and 67 extend in spaced parallel relation diametrically across the disk 55 so that the contact member 63 is substantially midway between the outer or free ends thereof.

The ends of the contact fingers are provided with suitable contact points 71 adapted to engage the contact member 63 upon rotary shifting of the inertia ring 45 with respect to the spindle 38. In order to cause the engagement of the contact fingers 66 and 67 with the contact member 63, a pair of pins 72 of insulating material are secured to the inertia ring, in spaced relation, with the contact fingers extending between the pins.

Upon sufficient rotary displacement of the inertia ring 45 in a counterclockwise direction with respect to the spindle and the connected disk 55 as seen in Fig. 4, one of the pins 72 engage the tip end of the contact finger 66 and bends it to effect engagement of the contact point 71 thereon with the contact member 63. Conversely, when the inertia ring 45 is shifted sufficiently in a clockwise direction (as seen in Fig. 4) with respect to the spindle 38 and disk 55, the other pin 72 engages the contact finger 67 and bends it so that the contact point 71 thereof engages the contact member 63.

The lower open end of the cylindrical casing 25 is counter-bored to receive a circular end cover 75, which may be held in position by a snap ring 76 engaging in a suitable annular groove formed in casing 25.

Secured in insulated relation to the cover 75 at the central point thereof is a contact stud or post 77, the rounded inner end of which engages the spring contact 62 at a point coincident with the axis of rotation of spindle 38 and the outer threaded end of which is provided with a suitable nut for securing a wire thereto.

Carried in concentric insulated relation to the contact stud 77 is a collector ring 79 which is connected by a conducting strap 81 to a terminal post 82 secured in insulated relation to the cover 75 in displaced relation to the contact stud 77. The terminal post 82 is provided with a suitable nut for securing a wire 83 thereto.

The collector ring 79 extends between the two contact fingers 66 and 67 and is of a diameter slightly less than the distance between the two contact fingers so that it is normally out of engagement therewith. Upon the rotary displacement of the inertia ring 45 with respect to the spindle 38, however, one or the other of the contact fingers 66 or 67 is effective to engage the collector ring 79, depending upon the direction in which the inertia ring shifts with respect to the spindle 38, at the same time that the outer end thereof engages the contact member 63.

It will thus be apparent that we have provided a switch mechanism having a relatively few number of parts and of sturdy construction which is operated in response to the rotary shift of the inertia ring 45 in either direction from its normal position with respect to the spindle 38. Thus, assuming that the inertia ring 45 is shifted in a direction to cause engagement of the contact point 71 of the contact finger 66 with the contact member 63, it will be seen (Fig. 3) that a circuit may be traced from the wire 78 through the contact stud 77, spring contact 62, contact member 63, contact finger 66, collector ring 79, contact strap 81, terminal post 82 to the wire 83.

In a similar manner, if the inertia ring 45 is shifted in the opposite direction so as to effect the engagement of the contact point 71 of the contact finger 67 with the contact member 63, the circuit may be traced from the wire 78 through the contact stud 77, spring contact 62, contact member 63, contact finger 67, collector ring 79, contact strap 81, and terminal post 82 to the wire 83.

The weight of the inertia ring 45 may be so selected and the design of the leaf spring elements 46 may be such that engagement of the contact fingers 66 and 67 with the contact member 63 will be effected whenever the rate of deceleration (or acceleration) of the car wheels 11 exceeds any certain selected rate. We intend to employ our rotary inertia device for controlling the brakes associated with the car wheels 11 in a manner to prevent the sliding of the wheels. In such case, the inertia ring 45 and the leaf spring elements 46 are so designed that the contact fingers 66 and 67 are not actuated into engagement with the contact member 63 unless the car wheels decelerate rotatively at a rate exceeding a rate corresponding to a rate of retardation of the car or train of ten miles per hour per second.

As is well known, the car wheels do not attain such a rate of rotative deceleration unless they are slipping, that is decelerating at an abnormally rapid rate from a speed corresponding to car speed to a locked condition.

Accordingly, whenever the car wheels begin to slip, the inertia ring 45 of the rotary inertia device shifts forwardly with respect to the spindle 38, which is of course being rotationally decelerated in accordance with the rate of rotational deceleration of the car wheels, thereby effecting the engagement of one or the other of the contact fingers 66 or 67 with the contact member 63 depending upon the direction for rotation of the wheels.

It will be apparent that if the car wheels always rotate in the same direction, only one of the contact fingers 66 or 67 may be required. However, as a practical matter, the car wheels may rotate in one direction at one time and in the opposite direction at another time depending upon the direction of travel of the car. In order to enable the rotary inertia device 21 to function whichever direction the wheels rotate, it is desirable therefore to provide the two contact fingers 66 and 67.

Any suitable type of control apparatus may be employed, subject to the control of the rotary inertia device, for effecting a rapid reduction in the degree of application of the brakes associated with the car wheels when the wheels first begin to slip thereby causing the slipping wheels to return promptly to a speed corresponding to car speed without actually reducing in speed to a locked condition and sliding.

In view of the fact that a slipping wheel accelerates back toward a speed corresponding to car speed at a rate sufficient to effect engagement of the corresponding contact fingers 66 or 67 with the contact member 63, it may be desirable to provide suitable control equipment which is unaffected by the engagement of the contact fingers with the contact member 63 in response to acceleration of the car wheels, for otherwise the reduction in the degree of the brake application will continue as long as either of the contact fingers engages the contact member 63.

However, the particular type of control circuits employed in connection with our rotary inertia device is immaterial for purposes of our present invention.

Having now described our invention, what we claim as new and desire to secure by Letters Patent, is:

1. A rotary inertia device comprising a rotary shaft, an inertia ring, and means associating the inertia ring and the shaft in a manner to cause the inertia ring to have a certain normal position rotatively with respect to the shaft as long as the shaft rotates at a constant speed and to permit rotative shifting of the inertia ring with respect to the shaft in either direction with respect to the normal position in response to the deceleration and acceleration of the rotary shaft, and a switch mechanism operated in response to the rotative shifting of the inertia ring with respect to said shaft, said switch mechanism comprising a pair of parallel extending contact fingers carried in insulated relation by said shaft, a contact carried by said shaft in insulated relation to and between said contact fingers, a non-rotative collector ring supported between and normally out of engagement with said contact fingers, a central non-rotative contact disposed in coaxial relation to said shaft and having one end in engagement with said contact, and means carried by the inertia ring effective to cause bending of one or the other of said contact fingers, upon the rotative shifting of the inertia ring out of its normal position, into simultaneous engagement with said contact and said collector ring.

2. A rotary inertia device comprising a rotary shaft, an inertia ring associated with said shaft in a manner to have a normal position with respect thereto as long as the shaft rotates at a constant speed and shiftable rotatively with respect to said shaft out of the normal position upon a change in speed of the shaft, a flexible contact finger carried by said shaft, a contact member on said shaft normally disengaged from said contact finger and having a portion intersecting the axis of rotation of said shaft, a stationary support, a contact carried by said support and adapted to engage said contact member substantially at the axis of rotation of said shaft, a collector ring fixedly carried by said support in a position adjacent to and normally out of engagement with said contact finger, and means on said inertia ring cooperating with said contact finger and effective upon rotary displacement of the inertia ring out of the normal position thereof with respect to said shaft for causing said contact finger to simultaneously engage said contact member and said collector ring.

3. A rotary inertia device comprising a rotary shaft, an inertia ring associated with said shaft in a manner to have a normal position with respect to said shaft as long as the shaft rotates at a constant speed and shiftable rotatively with respect to said shaft out of said certain normal position upon a change in speed of the shaft, a stationary support, a contact carried by said support in coaxial relation to the axis of rotation of said shaft, a collector ring carried by said support in insulated concentric relation to said contact, a contact member carried by said shaft and normally engaging said contact carried by said support, a contact finger carried by said shaft and normally out of engagement with said contact member and said collector ring, and means on the inertia ring cooperating with said contact finger and effective when the inertia ring is shifted rotatively out of its normal position with respect to the said shaft for bending said contact finger into simultaneous contact with the contact member and said collector ring.

4. A rotary inertia device having a casing forming a chamber open at one end, a rotary shaft journaled in said casing, one end of said shaft projecting to the exterior of the casing and the other end terminating in said chamber, a driving wheel fixed on the outer end of said shaft, an inertia ring contained within the chamber, means supporting said inertia ring on said shaft in coaxial relation thereto and effective to maintain said inertia ring in a certain normal position with respect to said shaft as long as the shaft rotates at a constant speed and adapted to permit the inertia ring to shift rotatively out of its normal position in either direction upon a change in rotational speed of the shaft, a removable cover adapted to close the open end of said chamber, a contact carried by said cover in a position substantially coincident with the axis of rotation of said shaft, a collector ring carried by said cover in concentric relation to the axis of rotation of said shaft, a contact member carried by said shaft and adapted to engage the contact carried by said cover, a contact finger carried by said shaft and normally out of engagement with said contact member and said collector ring as long as the inertia ring is in its normal position with respect to the shaft, and means on the inertia ring cooperating with said contact finger for bending said contact finger into simultaneous engagement with the contact member on the shaft and said collector ring upon displacement of the inertia ring out of its normal position with respect to said shaft.

JOSEPH C. McCUNE.
GEORGE K. NEWELL.